(12) United States Patent
Spidella et al.

(10) Patent No.: US 9,756,361 B2
(45) Date of Patent: Sep. 5, 2017

(54) ON-DEMAND LOAD BALANCER AND VIRTUAL LIVE SLICER SERVER FARM FOR PROGRAM INGEST

(71) Applicant: Verizon Patent and Licensing Inc., Arlington, VA (US)

(72) Inventors: Matthew J. Spidella, Branchburg, NJ (US); Paul D. Heitlinger, Short Hills, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 28 days.

(21) Appl. No.: 14/341,126

(22) Filed: Jul. 25, 2014

(65) Prior Publication Data
US 2016/0029047 A1   Jan. 28, 2016

(51) Int. Cl.
| | |
|---|---|
| *H04N 21/2187* | (2011.01) |
| *H04L 29/06* | (2006.01) |
| *H04N 21/61* | (2011.01) |
| *H04N 21/845* | (2011.01) |
| *H04N 21/231* | (2011.01) |
| *H04N 21/239* | (2011.01) |
| *H04N 21/24* | (2011.01) |
| *H04N 21/63* | (2011.01) |
| *H04N 21/643* | (2011.01) |
| *H04N 21/658* | (2011.01) |
| *H04N 21/8352* | (2011.01) |
| *H04N 21/414* | (2011.01) |
| *H04N 21/4223* | (2011.01) |

(52) U.S. Cl.
CPC ..... *H04N 21/2187* (2013.01); *H04L 65/4084* (2013.01); *H04L 65/605* (2013.01); *H04L 65/80* (2013.01); *H04N 21/2393* (2013.01); *H04N 21/23103* (2013.01); *H04N 21/2402* (2013.01); *H04N 21/6125* (2013.01); *H04N 21/6175* (2013.01); *H04N 21/632* (2013.01); *H04N 21/64322* (2013.01); *H04N 21/6581* (2013.01); *H04N 21/6582* (2013.01); *H04N 21/8352* (2013.01); *H04N 21/8456* (2013.01); *H04N 21/41407* (2013.01); *H04N 21/4223* (2013.01)

(58) Field of Classification Search
CPC ............. H04N 21/6125; H04N 21/482; H04N 21/6582; H04N 7/17318
See application file for complete search history.

(56) References Cited

U.S. PATENT DOCUMENTS

| | | | |
|---|---|---|---|
| 7,912,893 B2* | 3/2011 | Agnoli | .................... H04L 29/06 709/201 |
| 2002/0104099 A1* | 8/2002 | Novak | ............... H04N 7/17318 725/136 |

(Continued)

*Primary Examiner* — Nathan Flynn
*Assistant Examiner* — Christine Kurien

(57) ABSTRACT

A method, a device, and a non-transitory storage medium to receive a request for an on-demand streaming service from a program source device, wherein the on-demand streaming service provides on-demand publishing of programs originating from program source devices, and wherein the publishing includes streaming of the programs via the Internet to users; obtain configuration data based on the request; spin up a live slicer server based on the request; transmit the configuration data to the live slicer server; and transmit a network address of the live slicer server to the program source device.

20 Claims, 12 Drawing Sheets

(56) References Cited

U.S. PATENT DOCUMENTS

| | | | |
|---|---|---|---|
| 2009/0007172 A1* | 1/2009 | Ahanger | G06Q 30/02 725/36 |
| 2010/0269135 A1* | 10/2010 | Hulse | G06F 9/4445 725/37 |
| 2011/0179106 A1* | 7/2011 | Hulse | G06F 9/4443 709/203 |
| 2012/0047166 A1* | 2/2012 | Katz | H04N 7/17318 707/769 |

\* cited by examiner

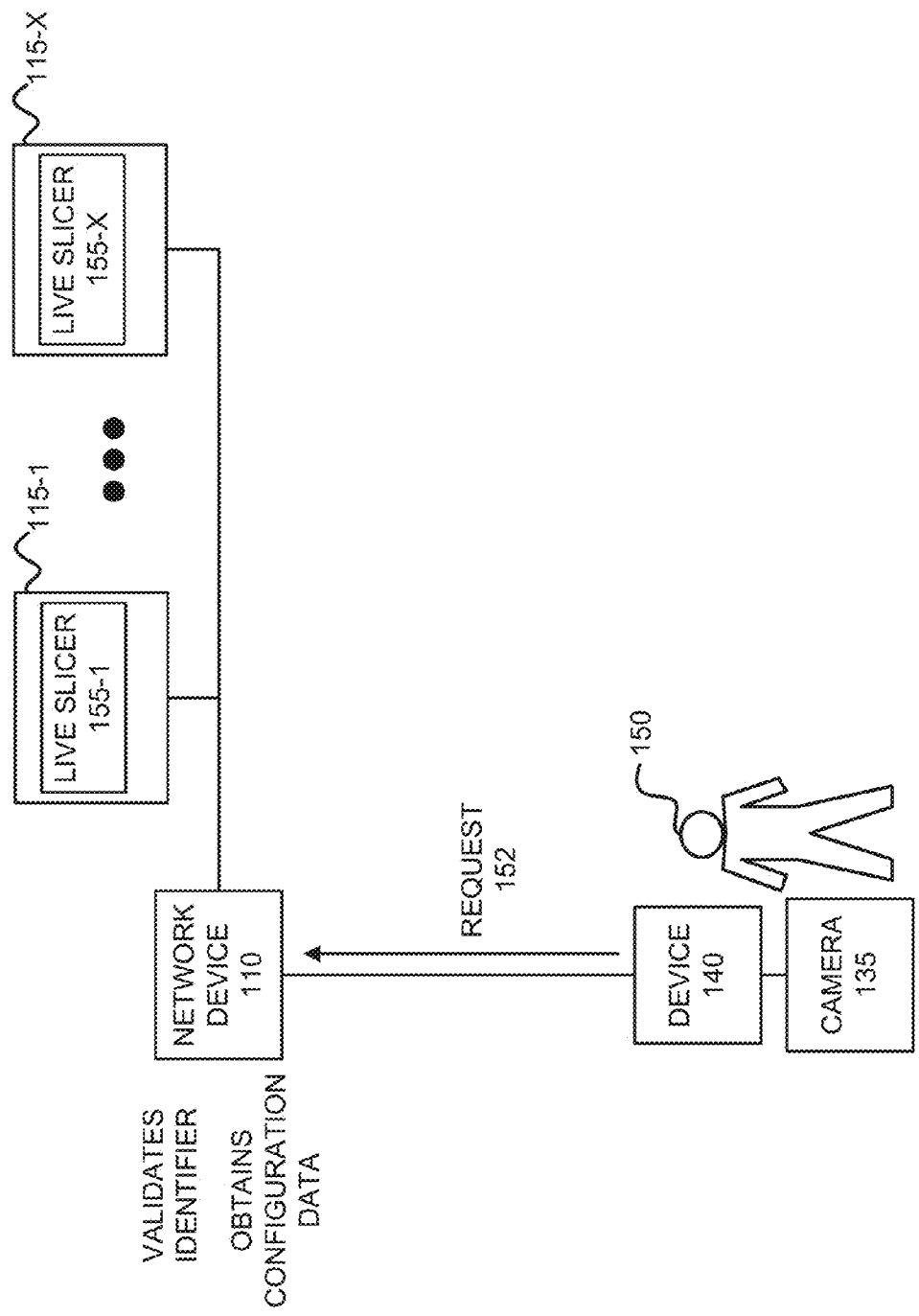

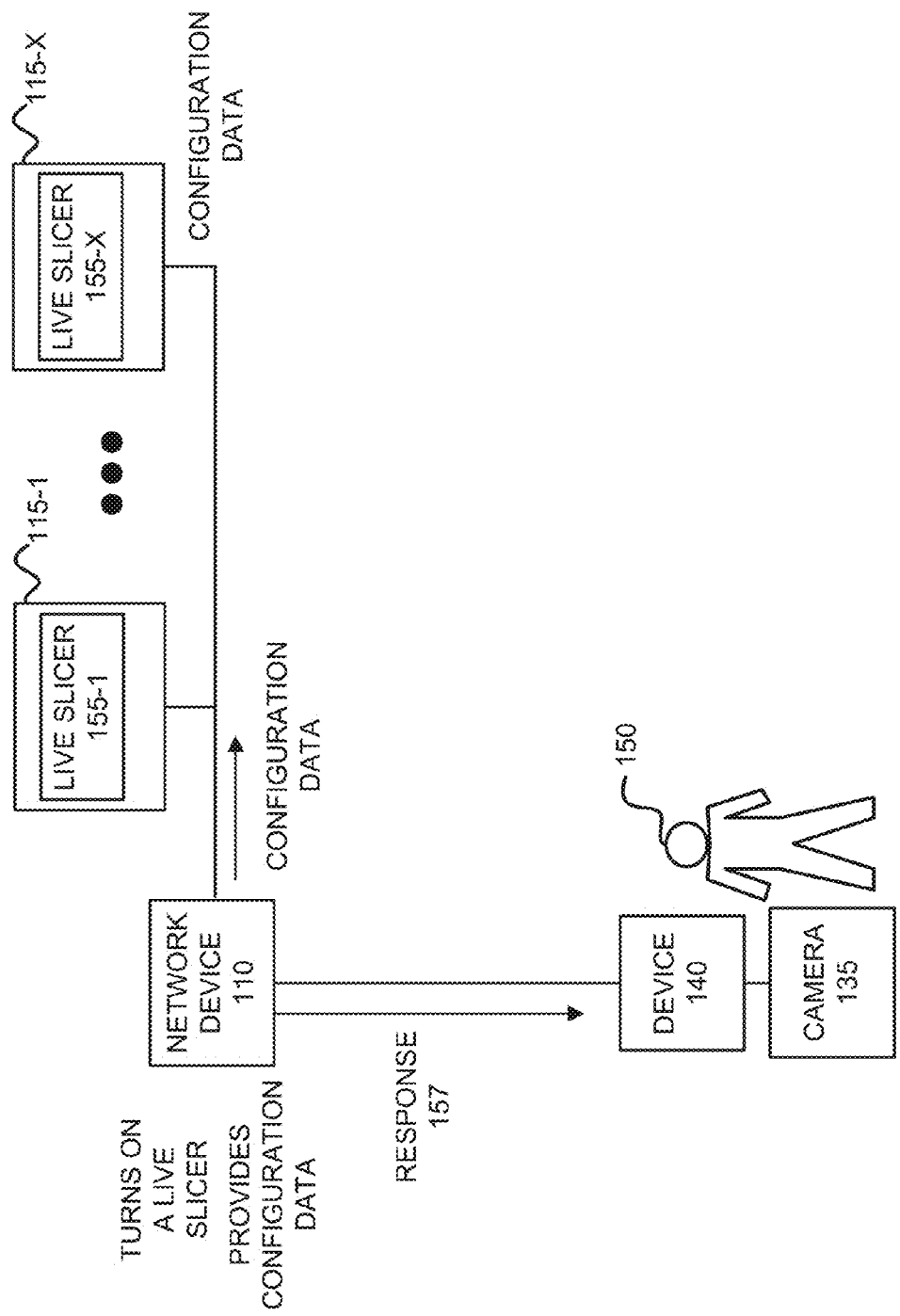

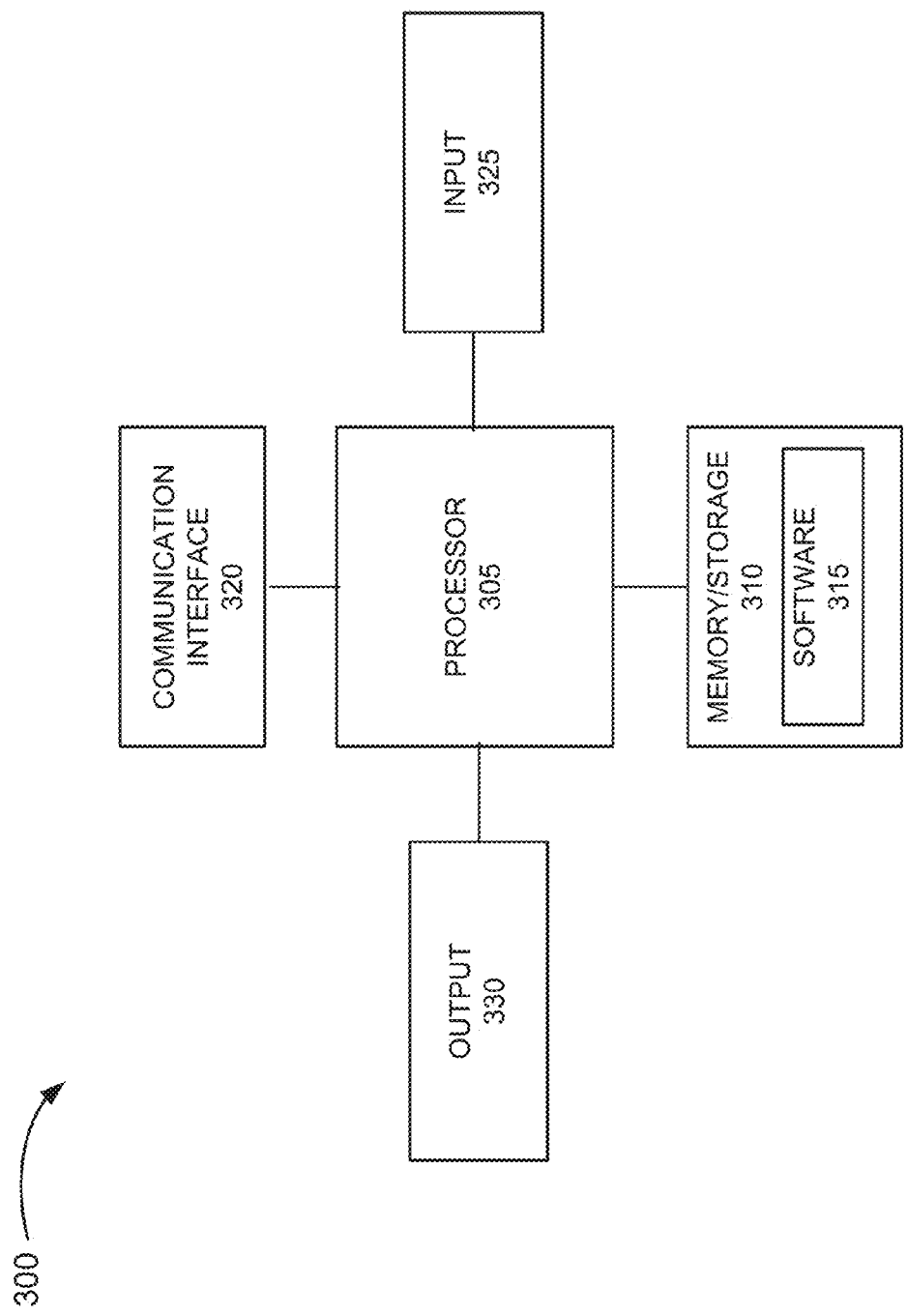

ON-DEMAND LOAD BALANCER AND VIRTUAL LIVE SLICER SERVER FARM FOR PROGRAM INGEST

BACKGROUND

Program providers have expanded their access to programs via the Internet. For example, major television networks and media sites offer streaming services to their subscribers. In turn, users can enjoy programs anytime and anywhere.

BRIEF DESCRIPTION OF THE DRAWINGS

FIGS. 1B-1E are diagrams illustrating an exemplary on-demand streaming service process;

FIG. 3 is a diagram illustrating exemplary components of a device that may correspond to one or more devices in the environment depicted in FIG. 1A;

DETAILED DESCRIPTION OF PREFERRED EMBODIMENTS

Figure 1A:
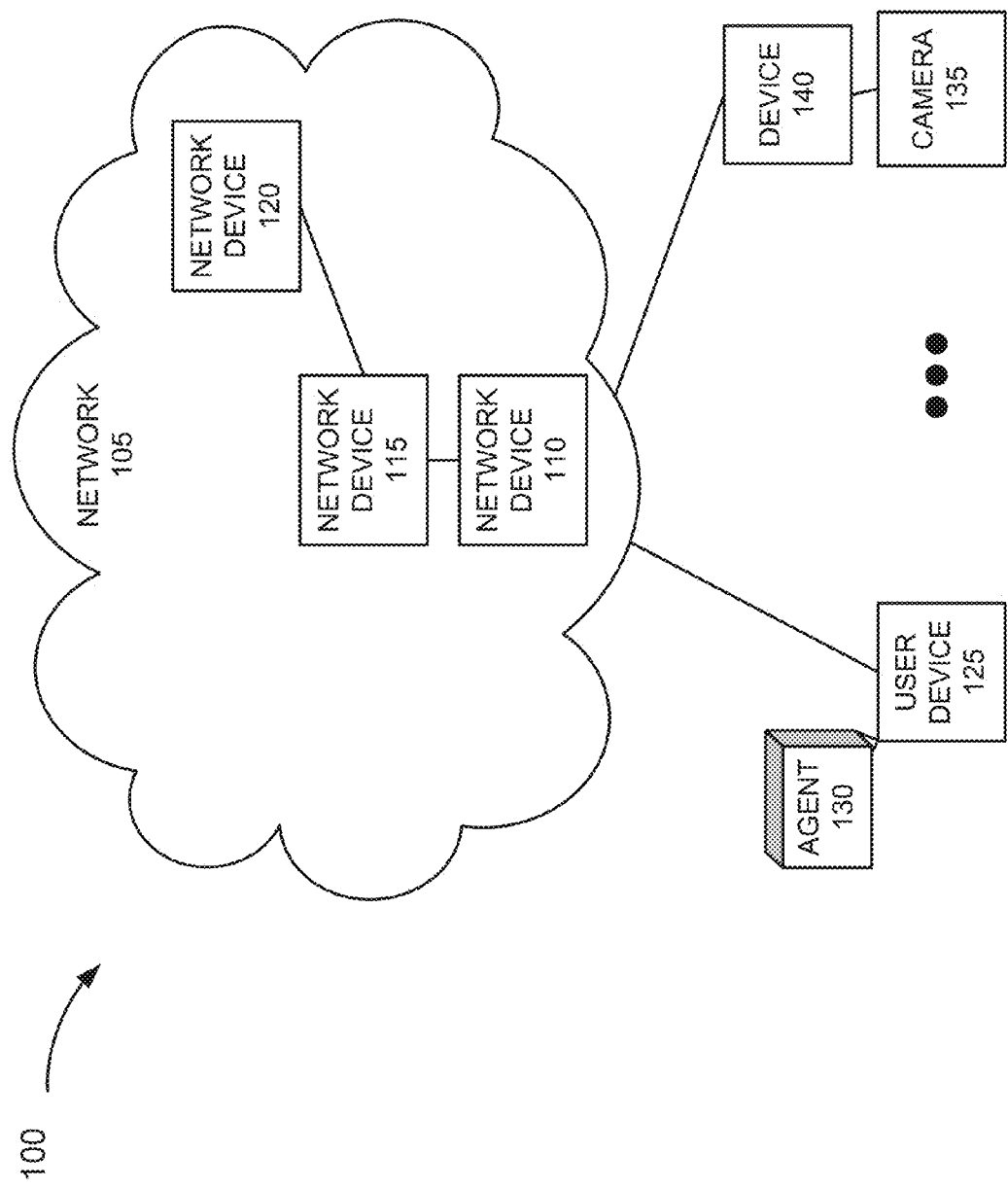
FIG. 1A is a diagram illustrating an exemplary environment in which an exemplary embodiment of the on-demand streaming service for program providers may be implemented.

The following detailed description refers to the accompanying drawings. The same reference numbers in different drawings may identify the same or similar elements. Also, the following detailed description does not limit the invention.

The term "program" as used herein, is intended to include visual data, audio data, or a combination of audio data and visual data. The program may be live or recorded. By way of example, the program may be a live feed of an event, such as a concert, a play, a news story, a sporting event, a graduation, a lecture, or another type of gathering.

A streaming service provider may offer a service that allows customers the ability to publish programs (also referred to as "feeds" or "live feeds") over the Internet for streaming to end users. Typically, the customer would contact the streaming service provider to turn on a virtual live slicer server and provide configuration details that pertain specifically to the customer. The streaming service provider would then assign a virtual live slicer server to the customer and provide the customer with certain details. Unfortunately, this approach requires manual intervention on the part of the streaming service provider and is inefficient.

According to an exemplary embodiment, an on-demand streaming service allows a program source device to request and obtain a streaming service, on-demand, for a program. According to an exemplary embodiment, a network device validates the request for streaming. For example, the request includes a unique identifier. According to an exemplary embodiment, upon successful validation, the network device spins up (e.g., turns on a live slicer server application), on-demand, a virtual live slicer server based on load balancing functions. For example, virtual live slicer software is installed on server devices. The network device continuously monitors the resource utilization (e.g., CPU usage, memory usage, etc.) of each server device. The network device selects the server device with the lowest load and causes an instance of the virtual live slicer server to execute on that server device. The virtual live slicer server services the request based on configuration data for that request. The network device may dynamically assign a network address and port number for the on-demand, virtual live slicer server. Alternatively, the network device may obtain the network address and port number from another device. The network device provides the network address and port number of the virtual live slicer server to the program source device. Upon receiving the network address and port number, the program source device captures the program and streams the program to the virtual live slicer server. In turn, the virtual live slicer server segments and encodes the program stream before transmission to a cloud service. The cloud service transcodes the program stream into one or multiple profiles for subsequent publishing to end users. According to an exemplary embodiment, the virtual live slicer server automatically tears down a streaming session after a certain period of inactivity. For example, the virtual live slicer server includes a watchdog script that monitors the port allocated to the program source device for inactivity. In view of the foregoing, the streaming service allows customers to publish (live) programs, on-demand, in a cloud environment.

FIG. 1A is a diagram illustrating an exemplary environment 100 in which an exemplary embodiment of the on-demand streaming service for program providers may be implemented. As illustrated in FIG. 1A, exemplary environment 100 includes a network 105 that includes a network device 110, a network device 115, and a network device 120. Additionally, environment 100 includes exemplary end user devices, such as a user device 125 that includes an agent 130, a camera 135 and a device 140.

Environment 100 may be implemented to include wired, optical, and/or wireless connections among the devices and the network illustrated. A connection may be direct or indirect and may involve an intermediary device and/or an intermediary network not illustrated in FIG. 1A. Additionally, the number, type (e.g., wired, wireless, etc.), and the arrangement of connections between the devices and the network are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices and configuration in environment 100 is exemplary and provided for simplicity. According to other embodiments, environment 100 may include additional devices, fewer devices, different devices, and/or differently arranged devices than those illustrated in FIG. 1A. Additionally, or alternatively, a single device in FIG. 1A may be implemented as multiple devices and/or multiple devices may be implemented as a single device. For example, according to other embodiments, there may be multiple network devices 110, 115, and/or 120. Additionally, or alternatively, environment 100 may include an additional network and/or a differently arranged network, than that illustrated in FIG. 1A. For example, environment 100 may include an intermediary network.

Network 105 includes one or multiple networks of one or multiple types. For example, network 105 may include the Internet, a wide area network, a private network, a public network, an intranet, a local area network, a packet-switched network, a wired network (e.g., an optical network, a cable network, etc.), a wireless network (e.g., a mobile network, a cellular network, etc.), etc. Although not illustrated, network 105 may include various other network devices, such as, one or multiple security devices, routing devices, gateways, access points, etc.

According to an exemplary embodiment, network 105 provides access to the on-demand streaming service for program providers. According to an exemplary embodiment, users of the on-demand streaming service may perform an on-boarding process. For example, a user may provide various types of information, such as equipment type used, set authentication and authorization information (e.g., user identifier, password), select user preferences (e.g., protocols used, video settings (e.g., bit rate, etc.), audio settings (e.g., stereo, Dolby 5.1, etc.), geo-blocking, etc.), billing information, etc. The on-boarding process may allow the user to create an account. For example, the user may wish to create an account that regularly uses the on-demand streaming service, such as a news organization, a school that regularly streams various events, etc. According to another exemplary embodiment, users may invoke the on-demand streaming service without performing an on-boarding process. For example, the on-demand streaming service may allow one-time users or first time users to stream various personal events to friends and family members. According to such an embodiment, the on-demand streaming service may use default configurations for these types of customers. Alternatively, this type of user may provide minimal configuration information during the request stage of invoking the service.

According to an exemplary embodiment, network devices 110, 115, and 120 provide the on-demand streaming service for program providers. According to an exemplary implementation, network devices 110, 115, and 120 are cloud devices in a cloud environment. Network device 110 includes a computing device that is capable of servicing on-demand requests for the streaming service. For example, network device 110 includes a server device. The server device authenticates and authorizes a program source user's request. For example, a program source device (e.g., user device 125, device 140, camera 135) transmits a request to invoke the on-demand streaming service. Additionally, network device 110 includes a load balancer. The load balancer selects a virtual live slicer server to service a successfully validated program source user based on load conditions. The load balancer may use algorithms (e.g., round robin, weighted round robin, least connections, least response time, etc.) to balance the physical resources on which the virtual live slicer servers operate or algorithms particular to the service provider, such as favoring particular customers based on subscriptions, policies, etc. For example, some customers may pay for priority access, which may be indicated (e.g., as a flag) in the request for service. The load balancer may operate at layer 4 or layer 7 of the OSI model. Network device 110 provides configuration data to the selected virtual live slicer server. According to an exemplary embodiment, network device 110 stores configuration data. For example, during an on-boarding process, network device 110 stores configuration data that correlates to authentication and/or authorization information. Alternatively, for users that do not perform an on-boarding process, network device 110 may store default configuration data and/or obtain minimal configuration data from the user. Based on the selection of the virtual live slicer server, network device 110 transmits network address and port information of the selected virtual live slicer server to the program source device. Network device 110 is described further below.

Network device 115 includes a computing device that processes a program for subsequent cloud processing. For example, network device 115 includes a virtual live slicer server. The virtual live slicer server receives a program from a program source device (e.g., user device 125, device 140). The virtual live slicer server may receive programs in various file formats, such as a .MOV file, a Moving Pictures Experts Group (MPEG) file, an audio video interleave (AVI) file, a Matroska (MKV) file, etc., programs at various bitrates (e.g., 25-30 Mbps), etc. The virtual live slicer server segments a program (i.e., slices), encodes (e.g., H.264, etc.) each segment, encrypts each segment, and then provides the program segments to network device 120. The virtual live slicer server also continuously monitors the state of a streaming session. In the event that the streaming session is inactive for a period of time, the virtual live slicer server tears down the connection between the virtual live slicer server and the program source device, as well as the connection to network device 120. Network device 115 is described further below.

Network device 120 includes a computing device that transcodes programs and streams programs to users. For example, network device 120 includes a server device. The server device receives the program stream from network device 115. Network device 120 transcodes the program according to well-known techniques. For example, network device 120 transcodes programs to a single bit rate or a multi-bit rate. Network device 120 may support smooth streaming, dynamic streaming, and/or adaptive bitrate streaming. Network device 120 may also support downloading of programs. Network device 120 may support various protocols, such as, the Real Time Streaming Protocol (RTSP), the Real Time Messaging Protocol (RTMP), the Hypertext Transfer Protocol (HTTP) Live Streaming (HLS), the Microsoft Media Services (MMS) protocol, etc., various definitions (e.g., standard, high (720, 1080, etc.), ultra high (e.g., 4K) of the program, etc. Network device 120 may provide other services, such as ad insertion, viewership analytics, etc.

User device 125 includes a mobile device. For example, user device 125 may take the form of a computer (e.g., a laptop computer, a palmtop computer, a tablet computer, a netbook, etc.), a personal digital assistant (PDA), a personal communication system (PCS) terminal, a smartphone, or a Web or Internet access device. According to an exemplary embodiment, user device 125 includes a camera that captures a program (e.g., audio/video). Agent 130 includes logic to communicate with and use the on-demand streaming service. Agent 130 can provide various user interfaces. For example, agent 130 may provide an interface to allow the program source user to generate a request to use the on-demand streaming service, enter log in information, and enter information pertaining to the streaming session (e.g., selection of configuration data, user preferences, etc.).

Camera 135 includes a device that captures a program. For example, camera 135 may take the form of a handheld video camera or a press or news-grade camera. Device 140 includes a device that converts a program to video over Internet Protocol (IP). Device 140 transmits the converted program to network device 115. For example, based on receiving the destination and port information of network device 115, device 140 transmits a video over IP feed to the virtual live slicer server. By way of example, device 140 may take the form of a Teradek® device or a device included in a television truck. According to another exemplary implementation, camera 135 includes the functionality of device 140.

FIGS. 1B-1E are diagrams illustrating an exemplary on-demand streaming service process. Although according to this scenario, the program source user is using camera 135 and device 140, according to other scenarios, the program source user may use user device 125 that includes agent 130. According to an exemplary scenario, assume that there are network devices 115-1 through 115-X (also referred to collectively as network devices 115 or individually as network device 115). Also assume that each network device 115 has live slicer server software (illustrated as live slicer 155-1 through 155-X, also referred to collectively as live slicers 155) that provides live slicer functionality, as described herein. According to an exemplary embodiment, network device 110 is able to "spin up" (e.g., turn on) a virtual live slicer server instance, on-demand, to service on-demand streaming requests. According to an exemplary scenario, and referring to FIG. 1B, a user 150 wishes to stream a live event. Assume that user 150 has already on-boarded with the on-demand streaming service. User 150 may configure device 140 to transmit a request 152 to network device 110. In this case, request 152 includes a user or an equipment identifier.

Figure 2:
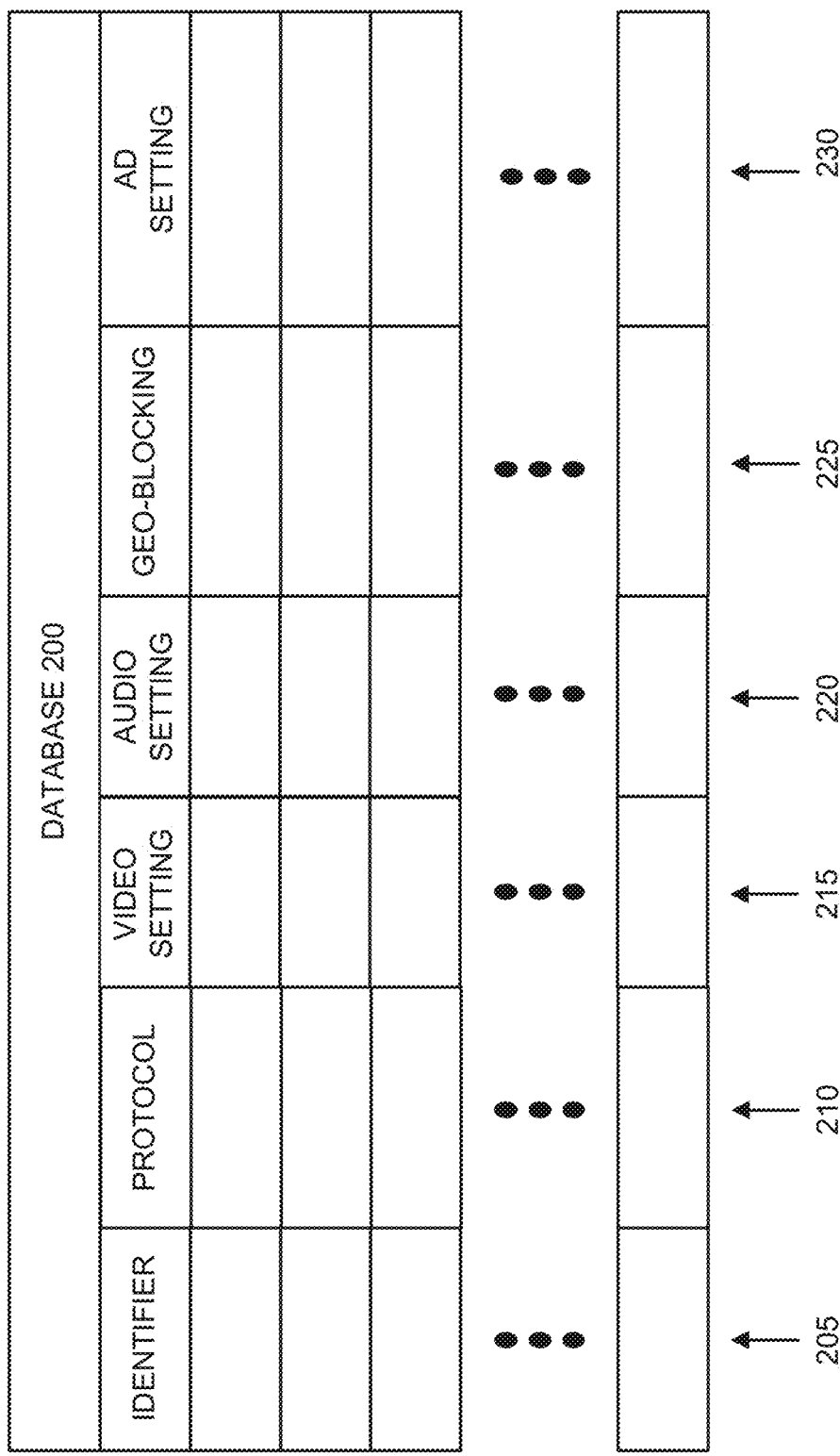
FIG. 2 is a diagram illustrating a database that stores exemplary configuration data.

As illustrated, network device 110 receives request 152. In response to receiving request 152, network device 110 determines whether request 152 is valid. For example, network device 110 accesses a database that stores identifiers and configuration data. FIG. 2 is a diagram illustrating a database 200 that stores exemplary configuration data. As illustrated, database 200 includes an identifier field 205, a protocol field 210, a video setting field 215, an audio setting field 220, a geo-blocking field 225, and an ad setting field 230. The configuration data may be used by network device 110 (e.g., the load balancer), network device 115 (e.g., the virtual live slicer server) and/or network device 120.

Identifier field 205 stores data that indicates an identifier. For example, the identifier may correspond to a user identifier, an equipment identifier, an account number, a password, and/or other type of string. The identifier may be used to validate a request to access and use the on-demand streaming service.

Protocol field 210 stores data that indicates protocols used by program source device for transmitting the program to network device 115. Protocol field 210 may also indicate protocols to be used for streaming a program by network device 120 to users.

Video setting field 215 stores data indicating the format and characteristics of the video (e.g. standard, high definition, type of video file, etc.) to be received by network device 115. Video setting field 215 may also store data indicating the format and characteristics (e.g., bitrates, type of streaming (e.g., adaptive, single, etc.)) of the video to be streamed.

Audio setting field 220 stores data indicating the format and characteristics (e.g., stereo, Dolby 5.1, etc.) of the audio to be received by network device 115. Audio setting field 220 may also store data indicating the format and characteristics of the audio to be streamed.

Geo-blocking field 225 stores data indicating a location for which the program is not to be made available. For example, the program source provider may wish to limit the number of users that may receive the program by geo-location.

Ad setting field 230 stores data indicating ad preferences, such as which ad server to use or whether to allow playback of the program without any ads, etc.

According to other implementations, database 200 may store additional, fewer, and/or different instances of configuration data. For example, database 200 may store billing information, transcoding preferences that indicate program players supported, whether to store the program for subsequent retrieval or downloading, etc. Database 200 may also store subscription information for particular program service providers, such as whether a particular program source user is a preferred customer that is provided with more options than a standard program source user.

Referring back to FIG. 1B, assume that network device 110 access database 200 and validates request 152. For example, network device 110 compares the identifier included in request 152 with data stored in identifier field 205. Network device 110 validates request 152 when the identifier included in request 152 matches one of the identifiers stored in identifier field 205. Based on a successful validation, network device 110 obtains configuration data stored in database 200 that correlates with the identifier included in request 152. Referring to FIG. 1C, network device 110 spins up (turns on) a virtual live slicer server on one of network devices 115. As previously described, network device 110 uses its load balancing function to select one of network devices 115 to spin on the virtual live slicer server. According to an exemplary embodiment, network device 110 continuously monitors the load of each network device 115. For example, network 110 may store a file (e.g., a flat-based file) that is continuously updated with the resource utilization usage (e.g., CPU, memory, number of connections, etc.) associated with each network device 115. Based on the current load conditions for each network device 115, network device 110 selects the one of the network devices 115 with the lowest, current load (e.g., lowest resource utilization). As an example, assume that there are fifty network devices 115. If the first twenty-five network devices 115 have live slicer instances executing, then network device 110 may select the next network device 115 (e.g., the $26^{th}$) to service the request. If each network device 115 has a live slicer instance executing, then network device 110 may round-robin back to the first network device 115 (e.g., the $1^{st}$ (i.e., network device 115-1) to execute a second instance of the live slicer based on a queue. In this regard, each network device 115 may run multiple instances of the live slicer server. According to another exemplary embodiment, virtual instances may be spun up, in which there is a virtualized template that runs on the operating system of network device 115 and has a virtualized live slicer that runs on start-up. Thus, in the event that there are no network devices 115 in the pool, a virtual machine can be spun-up that upon boot-up turns on a virtual live slicer according to configuration data of the on-demand request from the program source device.

Upon selection of virtual live slicer server 155, network device 110 provides the configuration data to the selected virtual live slicer server 155. Although not illustrated, virtual live slicer server 155 and/or network device 110 may transmit configuration data to network device 120. Additionally, network device 110 transmits a response 157 to device 140. Response 157 includes a destination address and port number of the selected virtual live slicer server 155. The destination address (e.g., an IP address) may be dynamically assigned or a static network address may be used. For example, IP addresses may be selected from a pool of IP addresses.

Figure 1D:
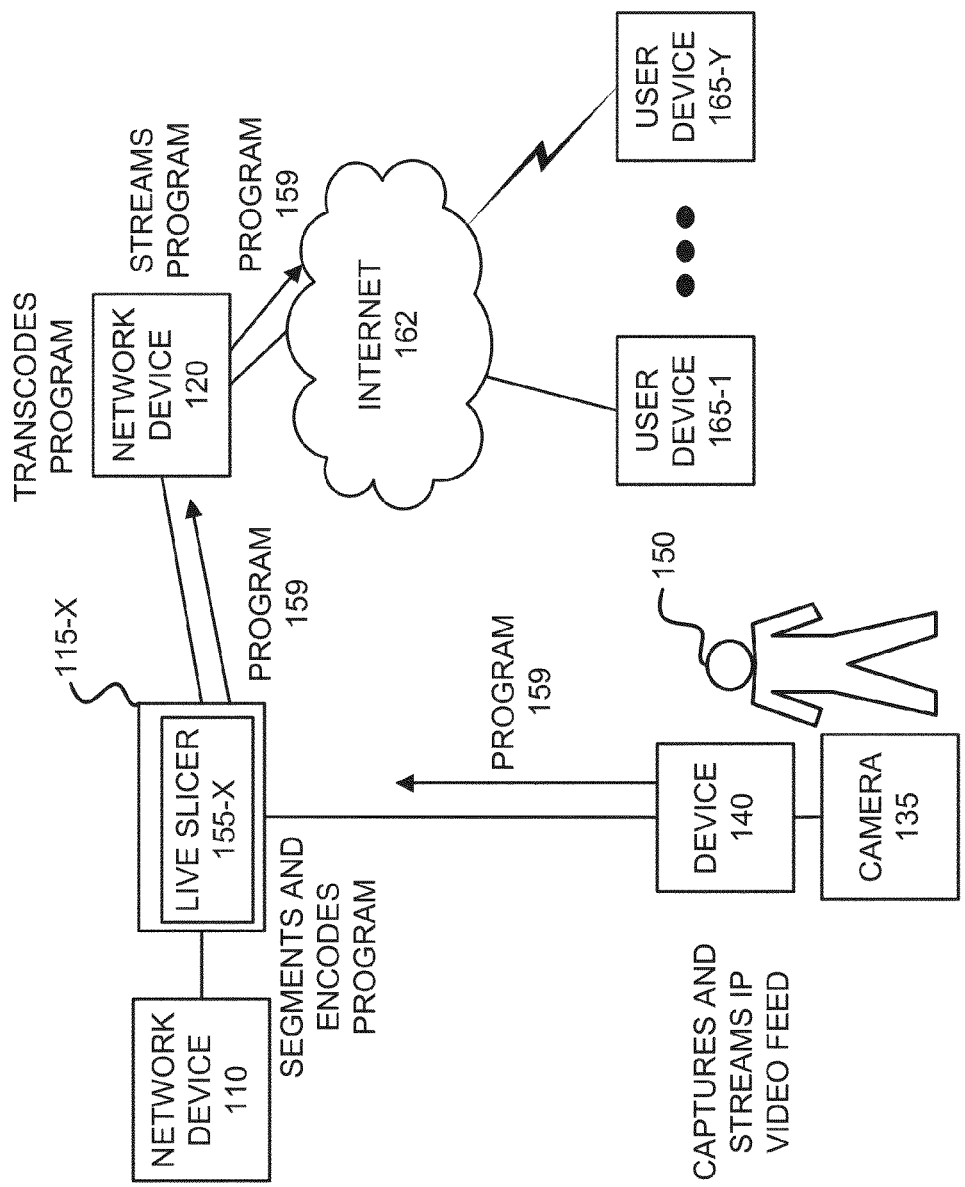

Referring to FIG. 1D, subsequent to receiving response 157, user 150 begins capturing an event (e.g., a news story) and streaming an IP video feed (e.g., program 159) to the selected virtual live slicer server 155. Upon receiving program 159, virtual live slicer server 155 continuously segments and encodes program 159. Virtual live slicer server 155 transmits the processed program 159 to network device 120. As further illustrated, upon receiving program 159 and possibly configuration data, network device 120 transcodes program 159 and makes program 159 available for users (not illustrated) of user devices 165-1 through 165-Y (referred to as user devices 165). For example, the users may request program 159 from network device 120 and program 159 may be streamed via Internet 162 (or other suitable network) to user devices 165. User device 165 may include an upLynk player or other suitable player. For example user device 165 may take the form of a mobile device or other suitable end user device (e.g., a smart television, etc.).

Figure 1E:
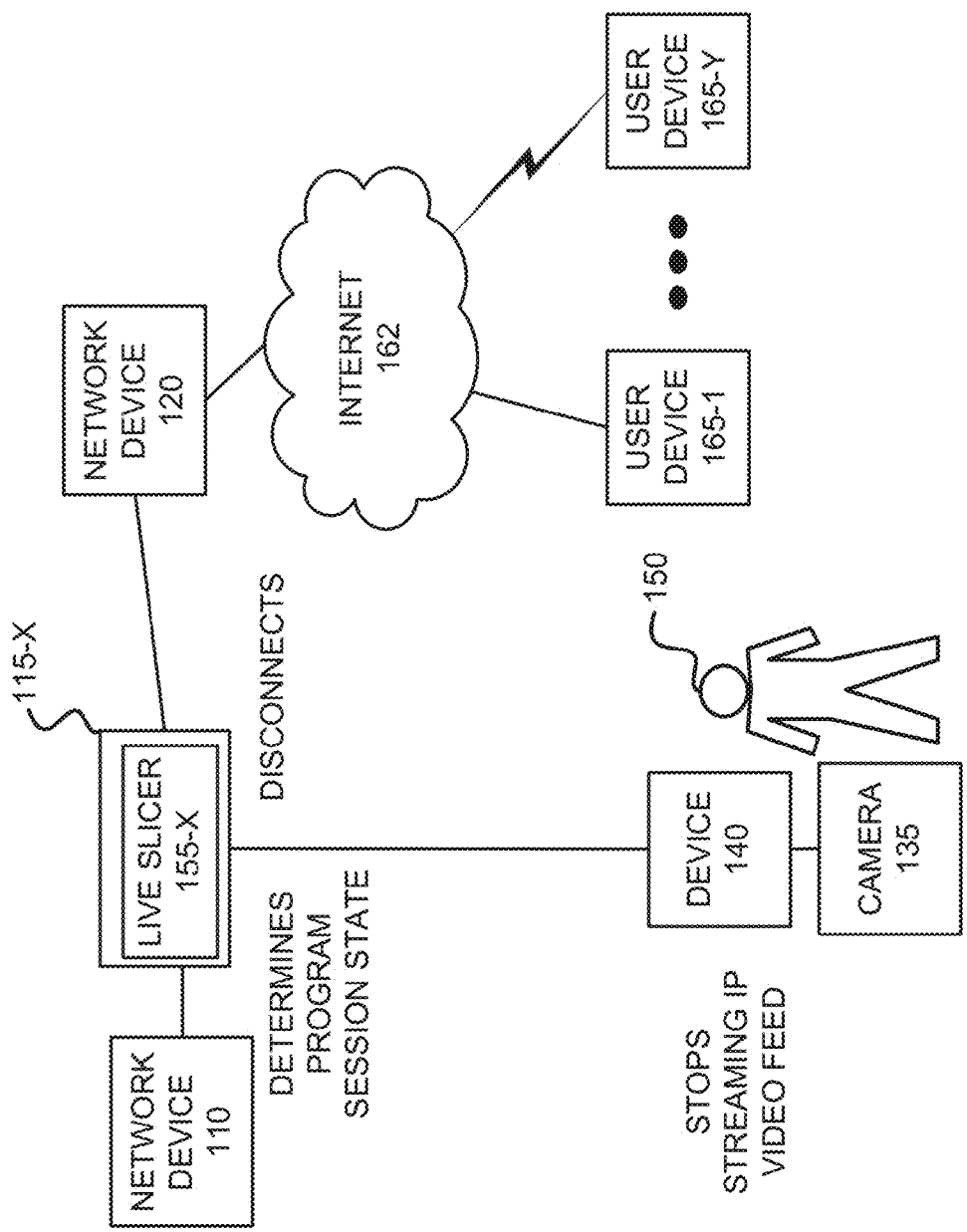

Referring to FIG. 1E, assume that the live event ends and user 150 causes camera 135 and device 140 to stop streaming the IP video feed. As previously described, virtual live slicer server 155 includes a monitoring system that determines the state of the streaming session. In this regard, virtual live slicer server 155 determines that the uploading has stopped and automatically disconnects from device 140. Although not illustrated, virtual live slicer server 155 may communicate to network device 120 that the streaming session has ended and disconnects. Virtual live slicer server 155 also automatically turns off (e.g., shuts down).

The scenario described in reference to FIGS. 1B-1E is exemplary. Various modifications to the on-demand streaming service described in relation to FIGS. 1B-1E may be implemented. For example, according to an exemplary embodiment, agent 130 may provide a user interface that allows the user to configure certain parameters. This may be useful for certain program source users that do not regularly use the on-demand streaming service, do not wish to subscribe to the service, or do not wish to go through an on-boarding process. In this regard, agent 130 may generate a request (e.g., request 152) that includes an identifier and configuration data, such as that described in relation to FIG. 2. Additionally, or alternatively, network device 110 may present default configurations via a user interface of agent 130. The program source provider may accept the default configurations before beginning the on-demand streaming session.

FIG. 3 is a diagram illustrating exemplary components of a device 300 that may correspond to one or more of the devices in environment 100. For example, device 300 may correspond to components included in network devices 110, 115, and/or 120, as well as user device 125, camera 135, and/or device 140. As illustrated, device 300 includes a processor 305, a memory/storage 310 that stores software 315, a communication interface 320, an input 325, and an output 330. According to other implementations, device 300 may include fewer components, additional components, different components, and/or a different arrangement of components than those illustrated in FIG. 3 and described herein.

Processor 305 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 305 may be implemented as hardware (e.g., a microprocessor, etc.) or a combination of hardware and software (e.g., a SoC, an ASIC, etc.). Processor 305 may include one or multiple memories (e.g., memory/storage 310), etc.

Processor 305 may control the overall operation, or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., another device, a network, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 310 may include a hard disk (e.g., a magnetic disk, an optical disk, a magneto-optic disk, a solid state disk, etc.) and a corresponding drive. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 310 may store data, software, and/or instructions related to the operation of device 300

Software 315 includes an application or a program that provides a function and/or a process. In this context, the term "program" is used in the sense of a sequence of instructions designed for execution on a computer system. A "program" or a "computer program" may include a subroutine, a function, a procedure, an object method, an object implementation, an applet, a servlet, a source code, an object code, a shared library/dynamic load library and/or other sequence of instructions designed for execution on a computer system. The term "program," when used to mean, for example, audio and/or video data versus used to mean a set of instructions will be apparent from the context of use in the present document.

Software 315 may include firmware. For example, with reference to user device 125, software 315 may include an application that, when executed by processor 305, provides the functions of agent 130, as described herein. Additionally, for example, with reference to network devices 110, 115, and 120, software 315 may include an application that, when executed by processor 305, provides the functionality of these network devices, as described herein.

Communication interface 320 permits device 300 to communicate with other devices, networks, systems and/or the like. Communication interface 320 includes one or multiple wireless interface(s) and/or wired interface(s). For example, communication interface 320 may include one or multiple transmitter(s) and receiver(s), or transceiver(s).

Input 325 provides an input into device 300. For example, input 325 may include a keyboard, a keypad, a touchscreen, a touch pad, a touchless screen, a mouse, an input port, a button, a switch, a microphone, a knob, and/or some other type of input.

Output 330 provides an output from device 300. For example, output 330 may include a display, a speaker, a light (e.g., light emitting diode(s), etc.), an output port, a vibratory mechanism, and/or some other type of output.

Device 300 may perform a function or a process in response to processor 305 executing software instructions stored by memory/storage 310. For example, the software instructions may be read into memory/storage 310 from another memory/storage 310 or read from another device via communication interface 320. The software instructions stored in memory/storage 310 may cause processor 305 to perform processes described herein. Alternatively, according to another implementation, device 300 may perform a process or a function based on the execution of hardware (e.g., processor 305, etc.).

Figure 4A:
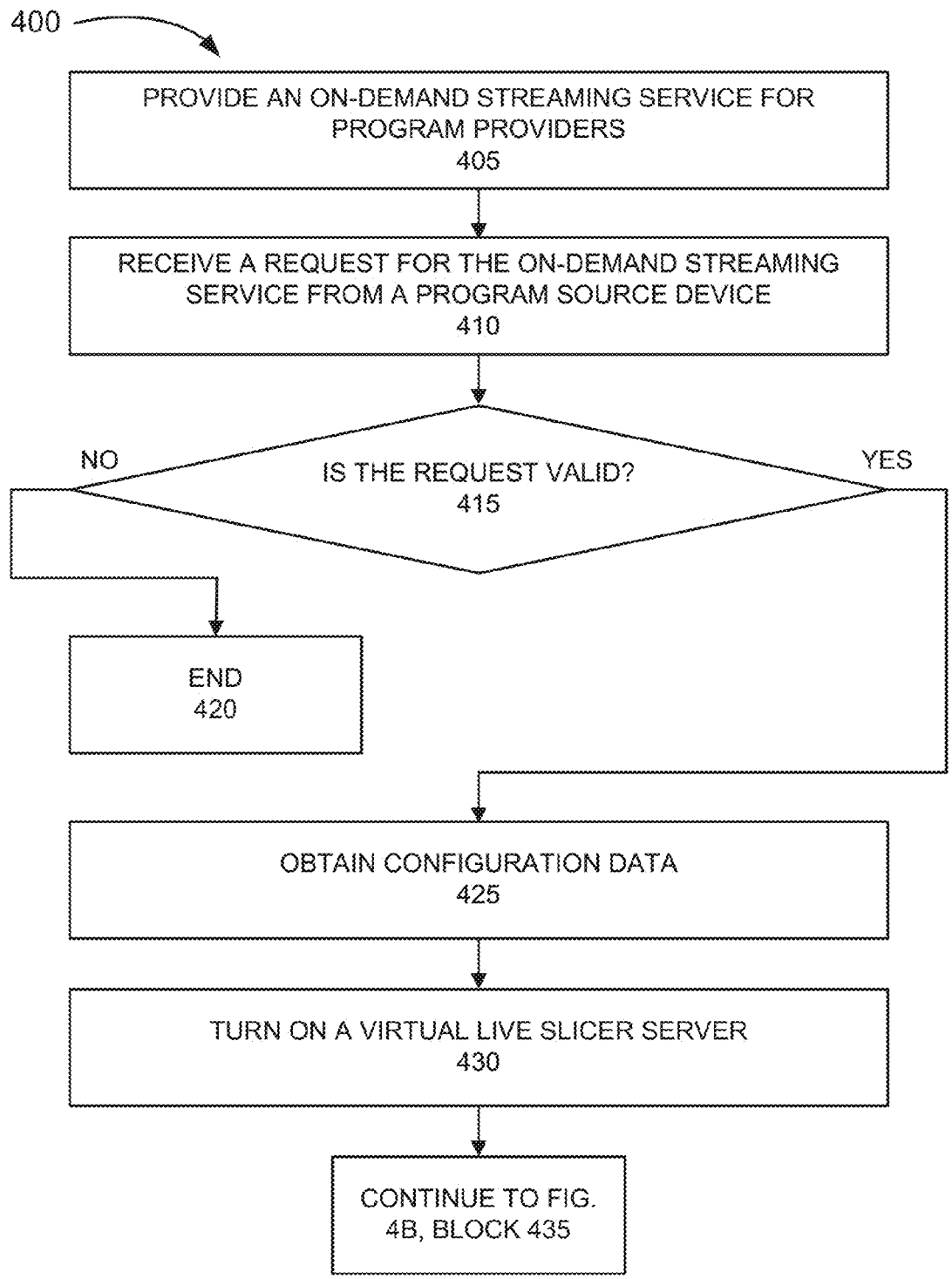
FIGS. 4A and 4B are flow diagrams illustrating an exemplary on-demand streaming process.
Figure 4B:
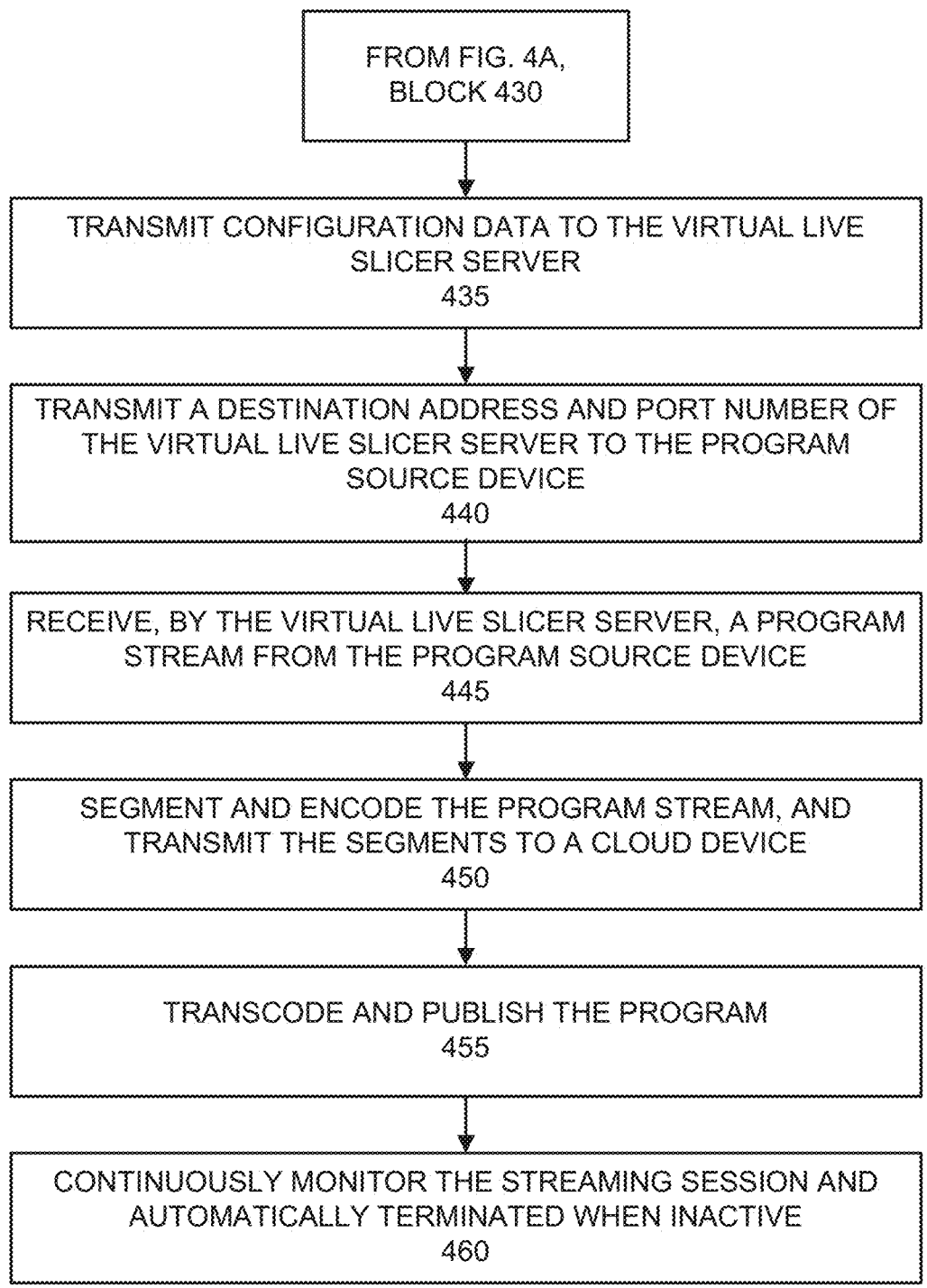

FIGS. 4A and 4B are flow diagrams illustrating an exemplary on-demand streaming process 400. Process 400 is directed to the embodiment, previously described above with respect to FIGS. 1B-1E, as well as elsewhere in this description, in which an on-demand streaming service for program source users is provided. According to an exemplary embodiment, one or more operations of process 400 are performed by network device 110. For example, the functionality of network device 110 may be implemented by processor 305 executing software 315. For purposes of description, it may be assumed that the program source user has on-boarded with the on-demand streaming service. However, according to other scenarios, as described herein, process 400 may involve different steps when the program source user has not on-boarded or does not have an account.

Referring to FIG. 4A, in block 405, an on-demand streaming service for program providers is provided. For example, network devices 110, 115, and 120 provide an on-demand streaming service to program source users that allow these users to broadcast programs, on-demand, via the Internet.

In block 410, a request is received for the on-demand streaming service. For example, the program source device (e.g., user device 125 or device 140) transmits a request to network device 110. The request includes an identifier, such as, for example, a user identifier, an equipment identifier, a password, and/or other type of unique identifier. According to other implementations, the request may include configuration data.

In block 415, it is determined whether the request is valid. For example, network device 110 authenticates and authorizes the program source user based on database 200. For example, network device 110 compares the identifier to data stored in identifier field 205 of database 200.

If it is determined that the request is not valid (block 415—NO), the process 400 ends (block 420). For example, network device 110 transmits a refusal to the program source provider. If it is determined that the request is valid (block 415—YES), the configuration data is obtained (block 425). For example, network device 110 correlates the identifier with configuration data stored in database 200, such as protocol, video setting, etc. Additionally, or alternatively, the request may include configuration data or other parameters pertaining to the streaming session (e.g., start and end time of event, subscription level indicator, etc.).

In block 430, a virtual live slicer server is turned on. For example, network device 110 spins up a virtual live slicer server 155 that is able to service the on-demand streaming session. As previously described, network device 110 spins up virtual live slicer server 155 based on load balancing techniques of network devices 115. Network device 110 turns on (e.g., causes an instance of a live slicer to execute) a live slicer 155 on the selected network device 115.

Referring to FIG. 4B, in block 435, the configuration data is transmitted to the virtual live slicer server. For example, upon selecting virtual live slicer server 155, network device 110 transmits the configuration data to virtual live slicer server 155. Network device 110 or network device 115 may also transmit configuration data to network device 120.

In block 440, a destination address and port number for the virtual live slicer server is transmitted to the program source device. For example, network device 110 transmits the destination address and port number of virtual live slicer server 155 to user device 125 or device 140.

In block 445, the virtual live slicer server receives a program stream from the program source device. For example, the program source device captures a program (e.g., audio and video) and transmits a program stream over IP to the virtual live slicer server.

In block 450, the program stream is segmented and encoded, and subsequently transmitted to network device 120. For example, the virtual live slicer server segments the incoming program stream and encodes the program stream into a particular file format. The virtual live slicer server transmits the processed streaming program to network device 120.

In block 455, the program is transcoded and published. For example, upon receiving the processed streaming program, network device 120 transcodes the program into one or multiple bitrates and publishes the program via the Internet 162. As previously described, users may request streams of the program from network device 120 via user devices 165.

In block 460, the streaming session is continuously monitored and automatically terminated when inactive. For example, the virtual live slicer server includes a monitoring system (e.g. a watchdog script) that monitors the state of the streaming program session in real-time or near real-time. Upon determining that the streaming program session has ended, the virtual live slicer server automatically tears down connections to the program source device and network device 120. The virtual live slicer server automatically turns off (e.g., shuts down) so as to save on physical resource utilization, cost, etc.

Although FIGS. 4A and 4B illustrate an exemplary process 400, according to other implementations, process 400 may include additional operations, fewer operations, and/or different operations than those illustrated in FIGS. 4A and 4B, and described herein. For example, depending on the program source user, the request to invoke the on-demand streaming service may include additional and/or different information. Additionally, or alternatively, for example, the request may not be validated. For example, the on-demand streaming service may allow one-time or first-time program source users to use the service without setting up an account, etc., provided sufficient information is provided for billing and configurations are selected.

Program providers, such as for example, broadcast networks (e.g., NBC, ABC, etc.), are recognizing the value of IP delivery of programs. Unfortunately, these program providers will not allow any third party equipment of a third party (e.g., teleco carriers, Internet carriers, etc.) at the program providers' datacenter centers for various reasons, such as to conserve space at their data centers, etc. Thus, third party carriers are unable to tap, ingest, and/or process the programs closest to the program source for subsequent delivery to end users.

Various types of service providers, such as, for example, cable Multiple System Operators (MSOs), Internet service providers, content/program providers (e.g., Google, Yahoo, television stations (e.g., NBC, etc.) etc.) use a co-location data center (also known as a carrier hotel). At this type of facility, each carrier (e.g., cable MSO, etc.) may have a suite or an entire floor (also known as a carrier room). The carrier can install their fiber into the carrier hotel via an entrance facility so as to establish a physical point-of-presence. At the carrier hotel, the carrier is also able to interconnect with other service providers either directly or using an intermediary (e.g., a Meet-Me-Room (MMR)). Program providers transmit their programs to the carrier hotel and carriers are able to obtain the programs and transmit these programs to their data centers for processing and delivery to end users. For example, the carrier may have cabinets and racks that include switches, routers, optical terminals, etc., in the carrier room.

According to an exemplary, ingest servers are co-located with carrier equipment at a carrier hotel. According to an exemplary embodiment, the ingest servers include a virtual farm of virtual live slice servers. According to an exemplary embodiment, programs received by a carrier at the carrier hotel are processed by the virtual live slicer servers and transmitted to a cloud for distribution. This is in contrast to an existing approach in which the carrier transmits programs from the carrier hotel to their data center (e.g., a headend, etc.) for processing of the programs and subsequent distribution to end users. Virtual live slicer servers have been previously described.

Virtual ingestion of programs at the carrier hotel may allow greater flexibility to the carrier without modification to their data center and added connections between their data center and the carrier hotel. Additionally, as new customers and programming becomes available, the virtual live slicer servers allow the carrier to support a progression towards IP delivery of programs, while having a presence closest to the program source.

Figure 5:
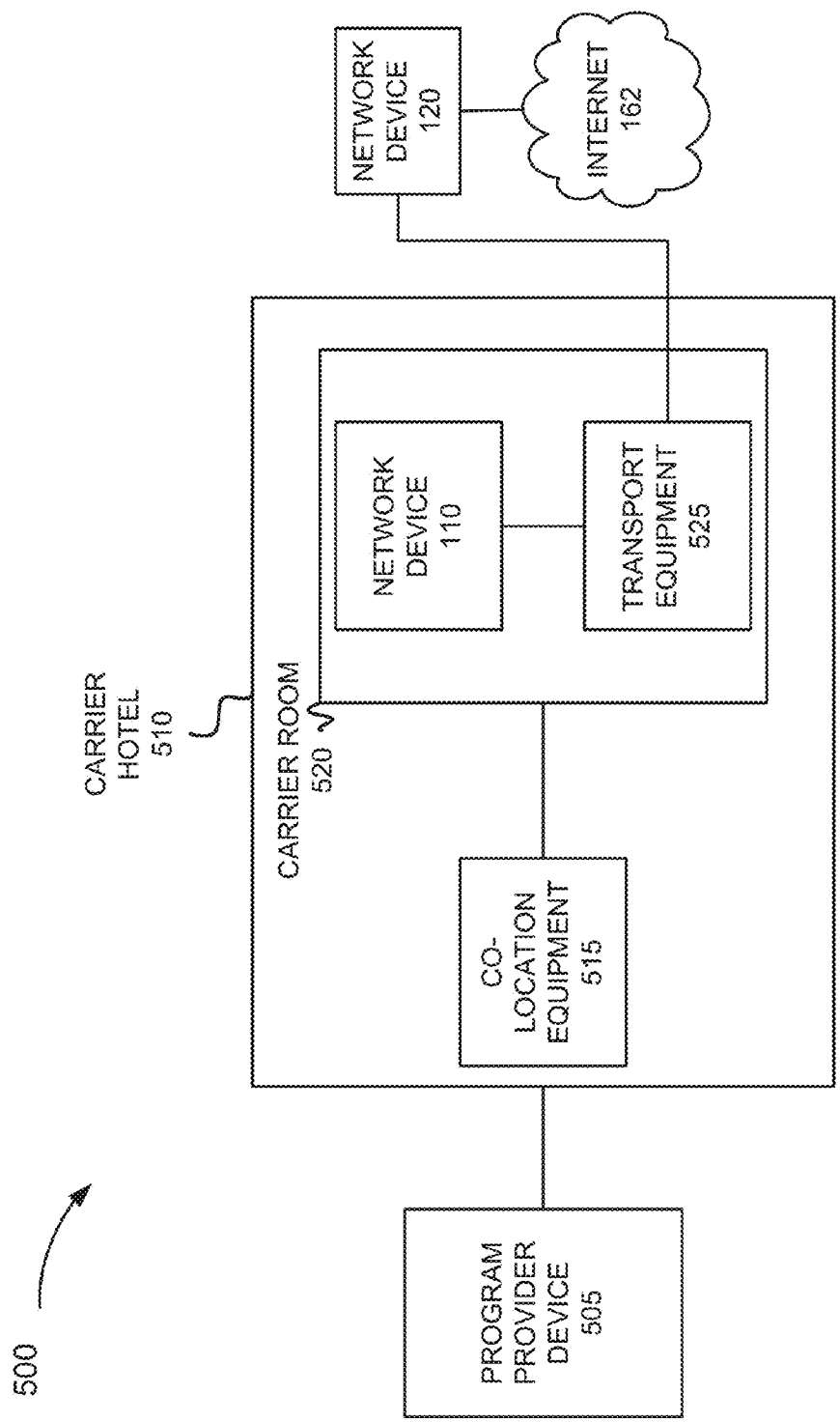
FIG. 5 is a diagram illustrating an exemplary environment in which ingest servers process programs at a carrier hotel.

FIG. 5 is a diagram illustrating an exemplary environment in which ingest servers process programs at a carrier hotel. As illustrated, environment 500 includes a program provider device 505 and a carrier hotel 510. Carrier hotel 510 includes co-location equipment 515 and a carrier room 520. Carrier room 520 includes transport equipment 525 and network device 110. As further illustrated, environment 500 includes network device 120 and Internet 162.

Environment 500 may be implemented to include wired, optical, and/or wireless connections among the devices and the network illustrated. A connection may be direct or indirect and may involve an intermediary device and/or an intermediary network not illustrated in FIG. 5. Additionally, the number, type (e.g., wired, wireless, etc.), and the arrangement of connections between the devices and the network are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices and configuration in environment 500 is exemplary and provided for simplicity. According to other embodiments, environment 500 may include additional devices, fewer devices, different devices, and/or differently arranged devices than those illustrated in FIG. 5. Additionally, or alternatively, environment 500 may include an additional network and/or a differently arranged network, than that illustrated in FIG. 5. For example, environment 500 may include an intermediary network.

Program provider device 505 includes a network device that transmits programs to and/or allows programs to be retrieved from carrier hotel 510. For example, program provider device 505 may be a data storage device, a server device, or a combination thereof.

Carrier hotel 510 includes a facility, such as a building, as previously described. Co-location equipment 515 includes equipment that allows service providers to interconnect with each other. For example, co-location equipment 515 may include storage devices and routers. Carrier room 520 is a space in the carrier hotel 510 to be used by a carrier to establish a point-of-presence. Transport equipment 525 includes devices that transport programs from carrier room 520 to another location. By way of example, transport equipment 525 includes routers, switches, and storage devices. Network device 110 has been previously described. According to an exemplary embodiment, network device 110 corresponds to and/or communicates with virtual live slicer servers, as previously described. Network device 120 has been previously described. An exemplary process for ingesting programs using network device 110 at the carrier hotel is described below.

Figure 6:
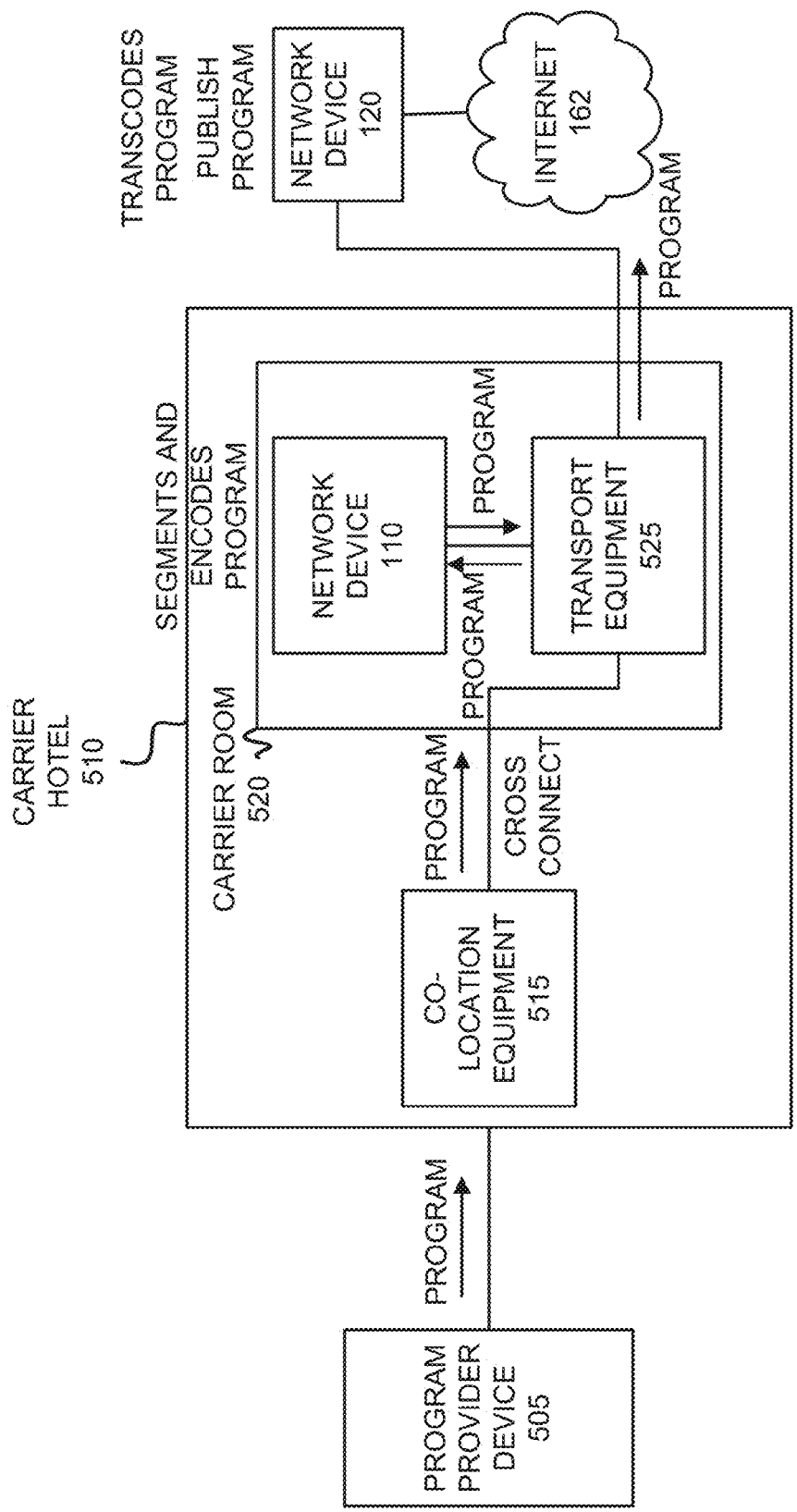
FIG. 6 is a diagram illustrating an exemplary program ingestion process at the carrier hotel.

FIG. 6 is a diagram illustrating an exemplary program ingestion process at the carrier hotel. As illustrated, assume co-location equipment 515 obtains a program from program provider device 505. The carrier of carrier room 520 obtains the program from co-location equipment 515 via a cross-connect (i.e., a physical medium, such as a fiber, T1, etc.). Transport equipment 525 transmits the program to network device 110. As previously described, according to an exemplary embodiment, network device 110 includes or communicates with a virtual live slicer server farm (e.g., virtual live slicer servers 155). Within the virtual live slicer server farm, virtual live slicer servers may be used (e.g., spun up or spun down) as needed. As illustrated, network device 110 segments and encodes the program. Network device 110 transmits the program via transport equipment 525 to network device 120. Alternatively, network device 110 transmits the program directly to network device 120. Similarly, as previously described, network device 120 transcodes the program and publishes the program. For example, the program is made available to end users for downloading or streaming via Internet 162 or via another type of network using other suitable delivery methods.

Figure 7:
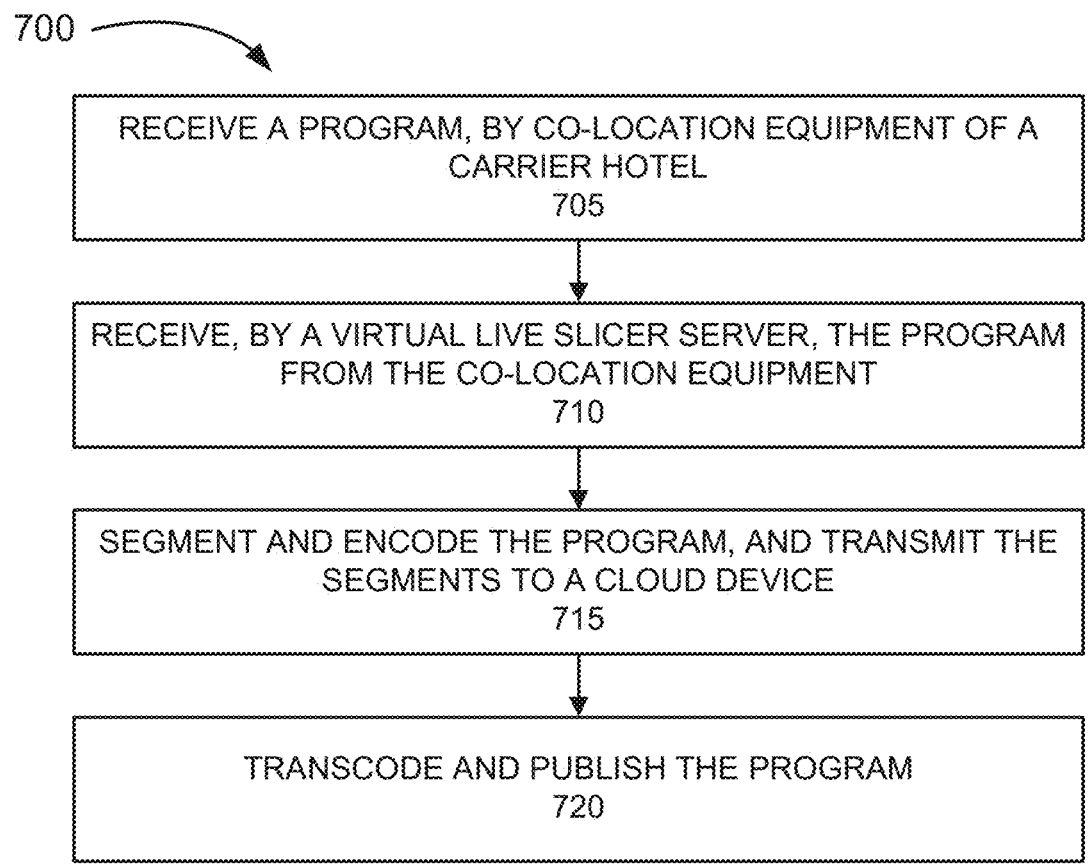
FIG. 7 is a flow diagram illustrating an exemplary process for ingesting a program at a carrier hotel using a virtual live slice server.

FIG. 7 is a flow diagram illustrating an exemplary process 700 for ingesting a program at a carrier hotel using a virtual live slicer server. Process 700 is directed to the embodiment, previously described above with respect to FIG. 6, as well as elsewhere in this description, in which network device 110 (e.g., a virtual live slicer server), at a carrier hotel, encodes programs, which are subsequently published for user consumption. According to an exemplary embodiment, one or more operations of process 700 are performed by a virtual live slicer server. For example, the functionality of network device 110 may be implemented by processor 305 executing software 315.

In block 705, a program is received by co-location equipment of a carrier hotel. For example, co-location equipment 515 receives a program from program provider device 505.

In block 710, the virtual live slicer server receives a program from the co-location equipment. For example, network device 110 receives the program from co-location equipment 515 via a cross connect and transport equipment 525, and selects a virtual live slicer server for processing the program.

In block 715, the program is segmented and encoded, and subsequently transmitted to a cloud device. For example, the virtual live slicer server segments the incoming program and encodes the program stream into a particular file format. The virtual live slicer server transmits the processed streaming program to network device 120 via transport equipment 525 or directly.

In block 720, the program is transcoded and published. For example, upon receiving the processed program, network device 120 transcodes the program into one or multiple bitrates and publishes the program. Users may request to stream or download the program from network device 120 via Internet 162 or other suitable network.

Although FIG. 7 illustrates an exemplary process 700, according to other implementations, process 700 may include additional operations, fewer operations, and/or different operations than those illustrated in FIG. 7, and described herein.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 4A, 4B, and 7, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 305) of a computational device. A non-transitory storage medium includes one or more of the storage mediums described in relation to memory/storage 310.

No element, act, operation, or instruction described in the present application should be construed as critical or essential to the embodiments described herein unless explicitly described as such.

What is claimed is:

1. A method comprising:

receiving, by a network device, a request for an on-demand live streaming service from a program source device, wherein the on-demand live streaming service provides on-demand segmenting, encoding, and publishing of programs originating from program source devices, and wherein the publishing includes live streaming of the programs via the Internet to users;

obtaining, by the network device, configuration data to configure a live streaming session based on an identifier included in the request that maps to the configuration data, wherein the configuration data indicates a communication protocol to be used by the program source device to transmit a live stream of a program, and an audio and video format to be used by the program source device for the live stream of the program;

spinning up, by the network device, a virtual live slicer server based on the request, wherein the spinning up comprises causing a virtual live slicer server application, which is installed on one of network devices, to execute in accordance with the configuration data, and the virtual live slicer server segments and encodes the live stream of the program to be received from the program source device;

transmitting, by the network device and prior to a transmission of the live stream of the program from the program source device, the configuration data to the virtual live slicer server that configures the virtual live slicer to service the live streaming session;

transmitting, by the network device and prior to the transmission of the live stream of the program from the program source device, a network address of the virtual live slicer server to the program source device; and spinning down the virtual live slicer server when the live streaming session of the program is ended, wherein the spinning down comprises causing the virtual live slicer server application to no longer execute and provide the virtual live slicer server.

2. The method of claim 1, further comprising:

receiving, by the program source device and from the network device, the network address of the virtual live slicer server, wherein the network address further includes a port number of the virtual live slicer server;

capturing, by the program source device, the program, subsequent to receiving the network address and the port number; and live streaming, by the program source device, the program to the virtual live slicer server during the capturing.

3. The method of claim 2, further comprising:

receiving, by the virtual live slicer server, the live stream of the program from the program source device; and encoding, by the virtual live slicer server, the live stream of the program in response to receiving the live stream of the program.

4. The method of claim 3, further comprising:

transmitting, by the virtual live slicer server, a live stream of the encoded program to a cloud device based on the encoding;

receiving, by the cloud device, the live stream of the encoded program;

transcoding, by the cloud device, the live stream of the encoded program in response to the receiving of the live stream of the encoded program; and publishing, by the cloud device, a live stream of the transcoded program.

5. The method of claim 3, further comprising:

monitoring, by the virtual live slicer server, during the receiving of the live stream of the program, a state of the live streaming session associated with the live stream of the program from the program source device;

determining, by the virtual live slicer server, whether the state is inactive; and disconnecting, by the virtual live slicer server, a connection between the virtual live slicer server and the program source device based on determining that the state is inactive.

6. The method of claim 5, further comprising:

transmitting, by the virtual live slicer server and to the network device, a message that indicates that the live streaming session associated with the live stream of the program has ended in response to determining that the state is inactive.

7. The method of claim 1, wherein the spinning up comprises:

load balancing, by the network device, physical resources of the network devices on which a virtual live slicer server farm operates, and wherein the virtual live slicer server is a part of the virtual live slicer server farm.

8. The method of claim 7, further comprising:

continuously updating a file that includes data indicating current utilization of the physical resources; and using the file to select the one of the network devices having a lowest physical resource utilization among the network devices to spin up the virtual live slicer server on-demand.

9. A device comprising:

a communication interface;

a memory, wherein the memory stores instructions; and a processor, wherein the processor executes the instructions to:

receive, via the communication interface, a request for an on-demand live streaming service from a program source device, wherein the on-demand live streaming service provides on-demand segmenting, encoding, and publishing of programs originating from program source devices, and wherein the publishing includes live streaming of the programs via the Internet to users;

obtain configuration data to configure a live streaming session based on an identifier included in the request that maps to the configuration data, wherein the configuration data indicates a communication protocol to be used by the program source device to transmit a live stream of a program, and an audio and video format to be used by the program source device for the live stream of the program;

spin up a virtual live slicer server based on the request, wherein the spin up comprises causing a virtual live slicer server application, which is installed on one of network devices, to execute in accordance with the configuration data, and the virtual live slicer server segments and encodes the live stream of the program to be received from the program source device;

transmit, via the communication interface and prior to a transmission of the live stream of the program from the program source device, the configuration data to the virtual live slicer server that configures the virtual live slicer to service the live streaming session;

transmit, via the communication interface and prior to a transmission of the live stream of the program from the program source device, a network address of the virtual live slicer server to the program source device; and receive, via the communication interface from the virtual live slicer server, a message that indicates that the live streaming session of the program is ended and the virtual live slicer server is to spin down, wherein the spin down comprises causing the virtual live slicer application to no longer execute and provide the virtual live slicer server.

10. The device of claim 9, wherein the processor further executes the instructions to:

access a database, wherein the database includes identifiers of at least one of program source users or program source devices and, configuration data mapped to the identifiers;

compare the identifier included in the request to the identifiers included in the database;

determine whether to validate the request based on the comparison of the identifier included in the request and the identifiers included in the database; and select the configuration data mapped to the identifier based on a determination that the request is valid.

11. The device of claim 9, wherein the configuration data includes a communication protocol setting, a video setting, an audio setting, a geo-blocking setting, and an advertisement setting pertaining to publishing of the live stream of the program from a network device to one or more of the users.

12. The device of claim 9, wherein the processor further executes the instructions to:

determine that the program source device does not have an account for the on-demand live streaming service; and wherein when obtaining the configuration data, the processor further executes the instructions to:

select one or more default values to use as the configuration data based on the determination that the program source device does not have the account.

13. The device of claim 9, wherein the processor further executes the instructions to:

receive, via the communication interface, the configuration data from the program source device; and transmit, via the communication interface, the configuration data received from the program source device to the virtual live slicer server.

14. The device of claim 9, wherein the processor further executes the instructions to:

load balance physical resources of the network devices on which a virtual live slicer server farm operates, and wherein the virtual live slicer server is a part of the virtual live slicer server farm.

15. The device of claim 9, wherein the processor further executes the instructions to:
store a file that includes data indicating current utilization of the physical resources of the network devices; and
update the file in response to the receipt of the message.

16. A non-transitory storage medium comprising instructions executable by a processor of a computational device, which when executed by the processor, cause the computational device to:
receive a request for an on-demand live streaming service from a program source device, wherein the on-demand live streaming service provides on-demand segmenting, encoding, and publishing of programs originating from program source devices, and wherein the publishing includes live streaming of the programs via the Internet to users;
obtain configuration data to configure a live streaming session based on an identifier included in the request that maps to the configuration data, wherein the configuration data indicates a communication protocol to be used by the program source device to transmit a live stream of a program, and an audio and video format to be used by the program source device for the live stream of the program;
spin up a virtual live slicer server based on the request, wherein the spin up comprises causing a virtual live slicer server application, which is installed on one of network devices, to execute in accordance with the configuration data, and the virtual live slicer server segments and encodes the live stream of the program to be received from the program source device;
transmit, prior to a transmission of the live stream of the program from the program source device, the configuration data to the virtual live slicer server that configures the virtual live slicer to service the live streaming session;
transmit, prior to the transmission of the live stream of the program from the program source device, a network address of the virtual live slicer server to the program source device;
receive a message that indicates the live streaming session of the program is ended and the virtual live slicer server is to spin down, wherein the spin down comprises causing the virtual live slicer application to no longer execute and provide the virtual live slicer server;
store a file that includes current utilization of the physical resources of the network devices; and
update the file in response to the receipt of the message.

17. The non-transitory storage medium of claim 16, further comprising instructions, which when executed by the processor, cause the computational device to:
access a database, wherein the database includes identifiers of at least one of program source users or program source devices and, configuration data mapped to the identifiers;
compare the identifier included in the request to the identifiers included in the database;
determine whether to validate the request based on the comparison of the identifier included in the request and the identifiers included in the database; and
select the configuration data mapped to the identifier based on a determination that the request is valid, wherein the configuration data mapped to the identifier further includes data indicating a communication protocol and an audio and video format to be used to publish the live stream of the program from a network device to one or more of the users, and wherein the data further indicates whether a user of the program source device is a preferred customer, whether to store the live stream of the program for downloading, and billing information pertaining to the user.

18. The non-transitory storage medium of claim 16, further comprising instructions, which when executed by the processor, cause the computational device to:
determine that the program source device does not have an account for the on-demand live streaming service; and wherein when obtaining the configuration data, the instructions further comprise instructions to:
select one or more default values to use as the configuration data based on the determination that the program source device does not have the account.

19. The non-transitory storage medium of claim 16, further comprising instructions, which when executed by the processor, cause the computational device to:
load balance physical resources of the network devices on which a virtual live slicer server farm operates based on a lowest usage selection and queue process, and wherein the virtual live slicer server is a part of the virtual live slicer server farm.

20. The non-transitory storage medium of claim 16, further comprising instructions, which when executed by the processor, cause the computational device to:
transmit the configuration data to a network device that publishes the live stream of the program to one or more of the users.

* * * * *